United States Patent Office 2,767,174

Patented Oct. 16, 1956

2,767,174

N-BENZYLIDENE AND N-QUINOLYLMETHYLENE-SUBSTITUTED 2-AMINOBENZISOTHIAZOLONES AND PROCESSES FOR THEIR PREPARATION

Leon Katz, Springfield, N. J., and William Schroeder, West Lafayette, Ind., assignors to Schenley Industries, Inc., New York, N. Y., a corporation of Delaware No Drawing. Application December 29, 1954, Serial No. 478,507

8 Claims. (Cl. 260—240)

The present invention relates to N-benzylidene and N-quinolylmethylene-substituted 2-aminobenzisothiazolones and processes for their production. A preferred embodiment of this invention comprises certain compounds of this type which have been found to possess high activity in vitro in controlling the organism *Brucella abortus* and which accordingly are potentially useful chemotherapeutic agents for the control of brucellosis and other diseases of humans and animals that are caused by such pathogenic organisms. The invention relates also to methods of preparing these novel compounds.

The novel N-benzylidene and N-quinolylmethylene-substituted 2-aminobenzisothiazolones of the present invention may be represented by the general formula in which Z is a phenyl, a quinolyl, or a phenyl or quinolyl radical substituted by one or more halogen, hydroxyl, carboxyl, alkoxy, or alkyl radicals. The phenyl moiety of the benzisothiazolone ring may also be substituted by one or more of these radicals, as well as by an alkylsulfonyl radical.

Four of the compounds of this invention inhibited the growth in vitro of the microorganism *Brucella abortus* MSL 1515 at a concentration within the range 0.5 to 1.25 gammas (micrograms) per milliliter. These four compounds are the following:

2-(3,4-dichlorobenzylideneamino)benzisothiazolone
2-(4-quinolylmethyleneamino)benzisothiazolone
2-(4-carboxybenzylideneamino)benzisothiazolone, and
2-(2-methoxybenzylideneamino)benzisothiazolone.

The formulae of each of these compounds is represented in connection with the examples and tables which follow hereinafter.

The foregoing four compounds and others disclosed in the present application have also exhibited activity against the following organisms:

*Staphylococcus aureus* FDA 209 (gram-positive)
*Proteus vulgaris* NRRL B–417 (gram-positive)
*Pseudomonas aeruginosa* Gottlieb 29 (gram-negative)
*Trichophyton mentagrophytes* ATCC 8757
*Candida albicans* ATCC 10231

The compounds of the present invention can be prepared by several different methods. They may be obtained in substantially stoichiometric yields by the oxidation with iodine in pyridine of dithiosalicylhydrazides, compounds that are described in the copending prior application of Leon Katz, Serial No. 350,510, and in the article by Leon Katz, Lawrence S. Karger, William Schroeder and Murray S. Cohen, in J. Org. Chem., October 1953, vol. 18, No. 10, pages 1380 to 1402. Such a reaction, for example, for the preparation of 2-(2,4-dichlorobenzylideneamino)benzisothiazolone from bis-(2,4-dichlorobenzylidene)dithiosalicylhydrazide, may be represented as follows:

Alternatively, certain of the compounds of the present invention can be prepared by the reaction of a thiosalicylhydrazide with thionyl chloride or with an aromatic sulfonyl chloride in the presence of alkali, as disclosed and claimed in our copending application Serial No. 478,508 filed on even date herewith.

The compounds may also be prepared by the reaction of thiosalicyloyl chloride-sulfenyl chloride with a benzylidine or quinolylmethylene hydrazide. The yields in this reaction are somewhat lower, however, than in either of the two foregoing type reactions, but they may nonetheless generally be greater than 50% of the stoichiometric. The preparation of 2-(2,4-dichlorobenzylideneamino)-benzisothiazolone in accordance with this method may be represented as follows:

The details of the preparation of 2-salicylidenebenzisothiazolone by this general method are illustrated in Example 4 hereinafter. The thiosalicyloyl chloride-sulfenyl chloride required for the preparation in accordance with the foregoing procedure can be obtained, as described in Example 4, by direct chlorination of dithiosalicyloyl chloride in carbon tetrachloride or other inert organic reaction medium. A crude mixture of dithiosalicyloyl chloride produced by treatment of dithiosalicylic acid with thionyl chloride, from which the excess thionyl chloride has been expelled, may be used in this preparation.

A further method which is capable of producing high yields (88% or more) consists in the condensation of 2-acetaminobenzisothiazolone with an aromatic aldehyde. The preparation of 2-(2,4-dichlorobenzylideneamino)- benzisothiazolone by this method may be represented as follows:

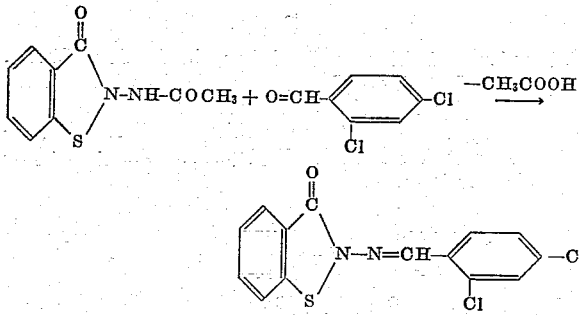

The 2-acetaminobenzisothiazolone which is required for this preparation can be obtained from diacetyldithiosalicylhydrazide prepared by methods described in the copending application of Leon Katz, Serial No. 350,510, which is oxidized with iodine in pyridine in accordance with the general methods described in this application. The preparation of 2-salicylideneaminobenzisothiazolone by this method is described in Example 5 hereinafter.

The following examples are illustrative of the compounds comprehended within the scope of the present invention and methods for their preparation.

*Example 1.*—Preparation of 2-(2,4-dichlorobenzylideneamino)benzisothiazolone having the formula:

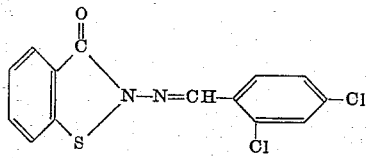

To a solution of 3.25 grams (0.01 mole) of bis-(2,4-dichlorobenzylidene)dithiosalicylhydrazide, prepared as described in Example 8 of the copending application of Leon Katz, Serial No. 350,510, dissolved in 25 milliliters of pyridine was added slowly with stirring at a temperature maintained between 5 and 10° C., a solution of 2.54 grams (0.01 mole) of iodine in 15 milliliters of pyridine. The brown iodine color disappeared as rapidly as the solution of iodine was added and crystals began to separate almost immediately after the completion of the addition. The reaction mixture was then diluted with 2 volumes of methanol and the precipitated solids were separated by filtration. A yield of 2.8 grams of the yellow needle-like crystalline product, having a melting point of 232–234° C., was obtained.

*Example 2.*—Preparation of 2-(4-quinolylmethyleneamino)benzisothiazolone having the formula:

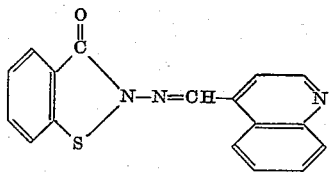

Approximately 4.5 grams (0.0061 mole) of bis-(4-quinolylmethylene)dithiosalicylhydrazide dihydrochloride (M. W. 685) prepared from dithiosalicylhydrazide dihydrochloride and 4-formylquinoline(4-quinoline carboxaldehyde) as described in Example 6 of the copending application of Leon Katz, Serial No. 350,510, was dissolved in 25 milliliters of pyridine. To this solution was then added slowly, a solution of 1.67 grams (0.131 mole, approximately 1.07 equivalents) of iodine dissolved in 10 milliliters of pyridine. Crystals separated shortly after the addition of the iodine was completed and the mixture was then allowed to stand in an ice bath. Methanol was then added and the crystals were separated by filtration, washed successively with water and a small amount of methanol, and dried in an oven. The crystals were somewhat soluble in methanol. The yield of crystals was 3.2 grams, corresponding to approximately 80% of the stoichiometric yield, and their melting point, after recrystallization from Cellosolve (β-methoxyethanol), was 212°–213° C.

*Example 3.*—Preparation of 2-(4-carboxybenzylideneamino)benzisothiazolone having the formula:

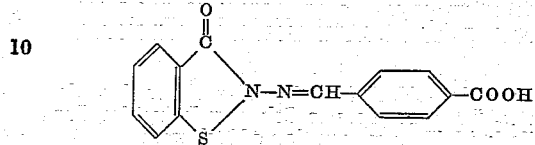

Two grams (0.0033 mole) of bis-(4-carboxybenzylidene)dithiosalicylhydrazide (M. W. 598), prepared from 4-carboxybenzaldehyde and dithiosalicylhydrazide in accordance with the procedure described in Example 8 of the copending application of Leon Katz, Serial No. 350,510, was dissolved in approximately 25 milliliters of pyridine. A solution of 1.7 grams (0.0135 mole, approximately 1.0 equivalent) of iodine in solution in approximately 10 milliliters of pyridine was then added slowly. The added iodine was consumed very rapidly and crystals separated during the addition. The mixture was then diluted with methanol and the crystals were separated by filtration, washed successively with water and methanol and dried in an oven. The yield was 1.6 grams (M. W. 298) corresponding to a yield of approximately 81% of the stoichiometric. After recrystallization from a mixture of methanol and dimethylformamide, the melting point of the purified crystalline product was 290–292° C.

Although in the foregoing examples the iodine was used in solution in pyridine and the reactions were carried out in pyridine, other tertiary amines such as dimethylaniline and C-alkylated pyridines may be used. To effect complete conversion it is necessary to use at least one equivalent of iodine. The reaction proceeds rapidly at normally prevailing room temperatures but in some cases it may be desirable to cool the reaction mixture.

Although iodine is the preferred oxidizing agent for conversion of dithiosalicylhydrazides to benzisothiazolones, other more reactive halogens, such as bromine and chlorine, may be used, especially with dithiosalicylhydrazides that are not readily ring-halogenated.

*Example 4.*—Preparation of 2-(salicylideneamino)-benzisothiazolone having the formula:

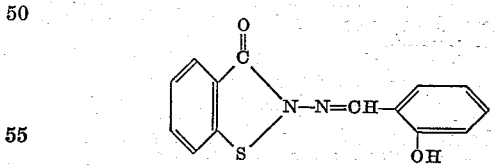

A stream of chlorine gas was passed through a suspension of 1.88 grams (0.007 mole) of dithiosalicyloyl chloride in 50 milliliters of carbon tetrachloride in accordance with the method described by McClelland and Gait, J. Chem. Soc., 1926, page 921. The solution was then freed from excess chlorine by passing a stream of nitrogen through it. A cooled mixture of 1.5 grams (0.011 mole) of salicylaldehyde hydrazone, 5 milliliters of dry pyridine and 50 milliliters of ethylene chloride was then added in a thin stream with stirring. The precipitate which formed was washed successively with ethylene chloride and water and dried in an oven at 50° C. The yield was 1.7 grams (57% of the stoichiometric) and the product had a melting point of 230–232° C. On recrystallization from dimethylformamide, its melting point was raised to 242–243.5° C.

*Example 5.*—Preparation of 2-(salicylideneamino)-benzisothiazolone from 2-acetaminobenzisothiazolone.

A solution of 2.08 grams (0.01 mole) of 2-acetaminobenzisothiazolone and 1.35 grams (0.011 mole) of salicylaldehyde in 60 milliliters of ethanol was heated to reflux temperature and 2.5 milliliters of concentrated hydrochloric acid was added thereto. The resulting solution was refluxed an additional half hour, during which period crystals began to deposit. After chilling the reaction mixture, the solid was collected by filtration and dried in an oven at 50° C. to yield 2.4 grams (88% of the stoichiometric) of crystalline product having a melting point of 241–243° C.

2-acetaminobenzisothiazolone (M. P. 145–147° C.) can be prepared from diacetyldithiosalicylhydrazide (M. P. 264–265° C.) by treatment in solution in dimethylformamide with a solution of iodine in pyridine, similarly to the method described in Examples 1 to 3 hereinbefore. Diacetyldithiosalicylhydrazide can be prepared by acetylation with acetic anhydride of an aqueous solution of dithiosalicylhydrazide containing hydrochloric acid. The preparation of dithiosalicylhydrazide is described in Example 2 of the copending application of Leon Katz, Serial No. 350,510.

By use of the foregoing general methods, the following additional substituted 2-aminobenzisothiazolones have been prepared. All of these compounds correspond to the general formula given hereinbefore in which Z represents the radicals whose formulae are given in the following table.

| | M. P., ° C. |
|---|---|
| 2-(3,4-Dichlorobenzylideneamino)benzisothiazolone | 238–239 |
| -(2-Methoxybenzylideneamino)benzisothiazolone | 195–196 |
| 2-(2-Ethoxybenzylideneamino)benzisothiazolone | 160–162 |
| 2-(2-n-Propoxybenzylideneamino)benzisothiazolone | 115–117 |
| 2-(2-n-Butoxybenzylideneamino)benzisothiazolone | 115–116 |
| 2-(2-n-Amyloxybenzylideneamino)benzisothiazolone | 103–104 |
| 2-(4-β-Chloroethoxybenzylideneamino)benzisothiazolone | 175–177 |
| 2-(4-β-Diethylaminoethoxybenzylideneamino)benzisothiazolone | 220 | and also the following compounds which have substituents in the benzisothiazolone nucleus:

| | M. P., ° C. |
|---|---|
| 2-(4-quinolylmethyleneamino) - 5 - chlorobenzisothiazolone | 214–216 |
| 2-(4-quinolylmethyleneamino) - 5,7 - dichlorobenzisothiazolone | 253–254 |
| 2-(4-quinolylmethyleneamino) - 6 - methylsulfonylbenzisothiazolone | 271–272 |

Inasmuch as the foregoing specification comprises preferred embodiments of the invention, which were selected for purposes of illustration only, it is to be understood that the invention is not restricted thereto and that variations and modifications can be made therein in conventional manner without departing from the invention, which is limited solely by the scope of the appended claims.

We claim:

1. A substituted 2-aminobenzisothiazolone having the formula

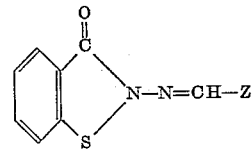

in which Z is a radical of the group consisting of 3,4-dichlorophenyl, 4-quinolyl, 4-carboxyphenyl, and 4-methoxyphenyl.

2. 2-(3,4-dichlorobenzylideneamino)benzisothiazolone.
3. 2-(4-quinolylmethyleneamino)benzisothiazolone.
4. 2-(4-carboxybenzylideneamino)benzisothiazolone.
5. 2-(4-methoxybenzylideneamino)benzisothiazolone.

6. A process for the production of a substituted 2-aminobenzisothiazolone which comprises subjecting to the action of iodine, in solution in a tertiary amine, a dithiosalicylhydrazide derivative having the formula

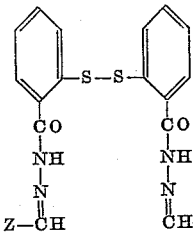

in which Z is a radical of the group consisting of phenyl, quinolyl, and phenyl and quinolyl radicals bearing a substituent of the group consisting of halogen, hydroxyl, carboxyl, alkoxy and alkyl radicals, and subsequently recovering the substituted 2-aminobenzisothiazolone thus formed.

7. A process for the production of a substituted 2-aminobenzisothiazolone which comprises subjecting a hydrazide having the formula $H_2N—N=CH—R$, in which R is a radical of the group consisting of phenyl, quinolyl, and phenyl and quinolyl radicals bearing a substituent of the group consisting of halogen, hydroxyl, carboxyl, alkoxy and alkyl radicals, to the action of thiosalicyloyl chloride-sulfenyl chloride, and subsequently recovering the substituted 2-aminobenzisothiazolone.

8. A process for the production of a substituted 2-aminobenzisothiazolone which comprises the condensation of 2-acetaminobenzisothiazolone with an aldehyde of the group consisting of benzaldehyde, quinolinecarboxaldehydes and halogen, hydroxyl, carboxyl, alkoxy and alkyl-substituted benzaldehydes and quinolinecarboxaldehydes, and subsequently recovering the substituted 2-aminobenzisothiazolone.

No references cited.